United States Patent
Kohnhaeuser et al.

(10) Patent No.: US 12,536,253 B2
(45) Date of Patent: Jan. 27, 2026

(54) SECURE ONBOARDING OF A COMPONENT IN A NETWORK

(71) Applicant: ABB Schweiz AG, Baden (CH)

(72) Inventors: Florian Kohnhaeuser, Riedstadt (DE); Roland Braun, Niederkassel Lülsdorf (DE); Rhaban Hark, Griesheim (DE); Pablo Rodriguez, Birkenau (DE)

(73) Assignee: ABB Schweiz AG, Baden (CH)

( * ) Notice: Subject to any disclaimer, the term of this patent is extended or adjusted under 35 U.S.C. 154(b) by 119 days.

(21) Appl. No.: 18/625,376

(22) Filed: Apr. 3, 2024

(65) Prior Publication Data

US 2025/0258894 A1 Aug. 14, 2025

(30) Foreign Application Priority Data

Apr. 3, 2023 (EP) .................................... 23166386

(51) Int. Cl.
*H04L 29/06* (2006.01)
*G06F 21/10* (2013.01)
*G06F 21/44* (2013.01)
*G06F 21/64* (2013.01)

(52) U.S. Cl.
CPC .......... *G06F 21/1084* (2023.08); *G06F 21/44* (2013.01); *G06F 21/645* (2013.01)

(58) Field of Classification Search
CPC .................................................. G06F 21/1084
See application file for complete search history.

(56) References Cited

U.S. PATENT DOCUMENTS

| | | | |
|---|---|---|---|
| 10,977,372 B2 | 4/2021 | Sood et al. | |
| 2016/0182499 A1 | 6/2016 | Sharaga et al. | |
| 2019/0332421 A1* | 10/2019 | Kozlowski | G06F 9/4856 |
| 2019/0349357 A1 | 11/2019 | Shukla et al. | |
| 2020/0193065 A1 | 6/2020 | Smith | |
| 2020/0327231 A1* | 10/2020 | Smith | G06F 21/33 |
| 2022/0222348 A1 | 7/2022 | Vaswani et al. | |

(Continued)

OTHER PUBLICATIONS

Paladi et al., "Trust Anchors in Software Defined Networks," *arXiv preprint arXiv:1806.07302*, 21 pp. (Jun. 19, 2018).

(Continued)

*Primary Examiner* — Jason K Gee
(74) *Attorney, Agent, or Firm* — Fitch Even Tabin & Flannery LLP

(57) ABSTRACT

A method for providing a secure onboarding of a component from at least one first host device into a second host device includes verifying the integrity, authenticity and/or execution environment of the first host device by an orchestrator; providing a trusted root certificate to the second host device by the orchestrator; providing an onboarding identity by the orchestrator to the first host device, when the integrity, the authenticity and/or the execution environment of the first host device has been verified; receiving the onboarding identity from the orchestrator by the first host device and assigning the onboarding identity to the component; providing the assigned onboarding identity to the second host device; and securely onboarding the component from the first host device into the second host device based on the assigned onboarding identity and the provided trusted root certificate.

11 Claims, 3 Drawing Sheets

(56) References Cited

U.S. PATENT DOCUMENTS

2023/0063428 A1* 3/2023 Nadiminti ............. H04L 63/126
2023/0353554 A1* 11/2023 Behera ................... B60L 53/68

OTHER PUBLICATIONS

Sudarsan et al., "Device Onboarding in Eclipse Arrowhead using Power of Attorney based Authorization," *2022 IEEE 27th International Workshop on Computer Aided Modeling and Design of Communication Links and Networks* (*CAMAD*), 26-32 (Nov. 2-3, 2022).

European Patent Office, Extended European Search Report in European Patent Application No. 23166386.5, 8 pp. (Sept. 8, 2023).

\* cited by examiner

SECURE ONBOARDING OF A COMPONENT IN A NETWORK

CROSS-REFERENCE TO RELATED APPLICATIONS

The instant application claims priority to European Patent Application No. 23166386.5, filed Apr. 3, 2023, which is incorporated herein in its entirety by reference.

FIELD OF THE DISCLOSURE

The present disclosure generally relates to a method for providing a secure onboarding of a component from at least one first host device into a second host device.

BACKGROUND OF THE INVENTION

The general background of this disclosure is the onboarding of components into an existing system of host devices.

During onboarding, it is essential that an automation engineer can verify the authenticity and integrity of components. Otherwise, an adversary can introduce rogue components to the plant network, which can have devastating consequences for security. Existing onboarding solutions rely on manufacturers pre-installing cryptographic keys and digital certificates in components, which give the component a unique onboarding identity. During onboarding, automation engineers verify these manufacturer-assigned identities to ensure the authenticity of new components before integrating them into the network.

Traditionally, industrial components are realized in hardware as so-called field devices. To ensure security, the necessary cryptographic material of these components is typically stored on the devices in hardware-protected memory. However, in modern industrial systems, components are increasingly implemented virtually, i.e., in software as containerized applications. Existing onboarding techniques fail to address the security needs of such containerized virtual components, since pre-installed cryptographic identities cannot be used to authenticate containerized applications. The reason for this is that containers may run on various physical host devices and may even be shifted from one host to another host during operation. An alternative approach would be pre-installing cryptographic identities in the containerized applications itself. However, this approach provides insufficient security, as an adversary with access to a container can copy it, obtain multiple components with the same onboarding identity, and thus impersonate the original component.

BRIEF SUMMARY OF THE INVENTION

Hence, there is a need to provide a solution for securely onboarding software components, including containerized applications, in industrial systems. In addition, since virtualized software components may be shifted from one host device to another host device after deployment, the onboarding solution must also enable shifting an onboarded component from a first host device to another second host device.

In one aspect, a method for providing a secure onboarding of a component from at least one first host device into a second host device, comprising verifying an integrity, authenticity and/or execution environment of the at least one first host device including the component by at least one orchestrator; providing a trusted root certificate to the second host device by the at least one orchestrator, providing an onboarding identity by the at least one orchestrator to the at least one first host device, when the integrity, the authenticity and/or the execution environment of the at least one first host device has been verified; receiving the onboarding identity from the orchestrator by the at least one first host device and assigning the onboarding identity to the component by the at least one orchestrator; passing the assigned onboarding identity to a second host device by the at least one first host device; and securely onboarding the component from the at least one first host device into the second host device by the orchestrator based on the assigned onboarding identity and the provided trusted root certificate.

BRIEF DESCRIPTION OF THE SEVERAL VIEWS OF THE DRAWING(S)

DETAILED DESCRIPTION OF THE INVENTION

The following embodiments are mere examples for the method, the first host device, the second host device, the orchestrator, and the system disclosed herein and shall not be considered limiting.

Figure 1:
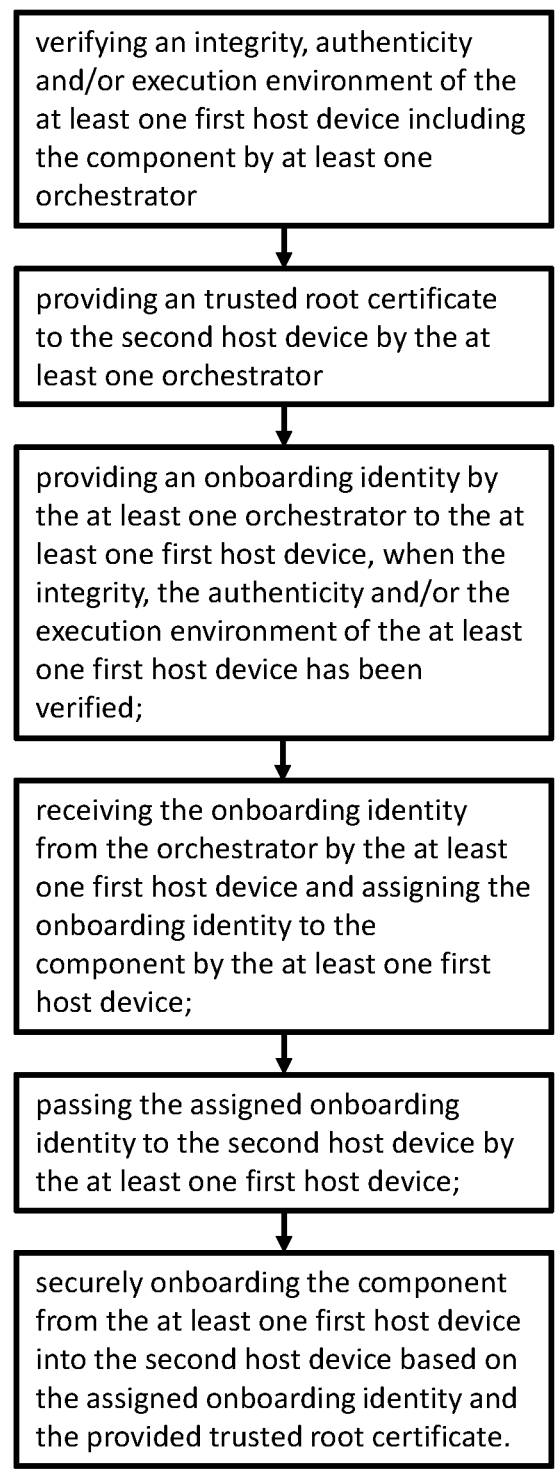
FIG. 1 is a flowchart of a method for providing a secure onboarding of a component from at least one first host device into a second host device in accordance with the disclosure.

FIG. 1 illustrates a flow diagram of a method for providing a secure onboarding of a component from at least one first host device into a second host device. In a first step, an integrity, authenticity and/or execution environment of at least one first host device is verified including the component by at least one orchestrator. The verification of the integrity and the execution environment is each provided by a remote attestation technique, wherein the used remote attestation techniques are different to each other. The verification of the authenticity is provided by a security certificate. The security certificate is an IEEE 802.1AR IDevID certificate. In a second step, a trusted root certificate is provided to the second host device by at least one orchestrator. The trusted root certificate is a known root certificate that is regarded as to be trustworthy by well-established organizations or larger communities. The trusted root certificate is preinstalled in an operating systems. The trusted root certificate is the "Trusted Root Certification Authorities" in the Windows Certificate Store. In a third step, an onboarding identity is provided by at least one orchestrator to at least one first host device, when the integrity, the authenticity and/or the execution environment of at least one first host device has been verified. The onboarding identity consists of a unique key and a digital certificate being associated to an orchestrator, e.g., as proposed by IEEE 802.1AR.

In a fourth step, the onboarding identity is received from the orchestrator by at least one first host device and the onboarding identity is assigned to the component by at least one first host device. The assigned onboarding identity comprises a unique key and a digital certificate being associated with the orchestrator. In a fifth step, the assigned onboarding identity is provided to the second host device by at least one first host device. In a sixth step, the component is secure onboarded from at least one first host device into the second host device based on the assigned onboarding identity and the provided trusted root certificate. The onboarding is provided by a Feature Data Object (FDO) protocol. In other words, the at least one orchestrator initiates the process and onboards the component into the second host device. A second host device is involved if transferring this identity from the first host device to the second host device. And of course all other host devices in the network are involved in the sense that they receive/store the root certificate to verify the identity certificate for the onboarded component.

Optionally, the method may comprise the further step of deleting the onboarding identity in the first host device, when the component has been securely onboarded into the second host device.

Alternatively, the above mentioned method can be used for a secure onboarding of a component from at least one orchestrator device into at least one first host device. The method comprises the following steps: verifying the integrity, authenticity and/or execution environment of at least one first host device including the component by at least one orchestrator; providing a trusted root certificate to the first host device by at least one orchestrator, providing an onboarding identity by at least one orchestrator to at least one first host device, when the integrity, the authenticity and/or the execution environment of at least one host device has been verified; receiving the onboarding identity from the orchestrator by at least one first host device and assigning the onboarding identity to the component by at least one orchestrator; passing the assigned onboarding identity to the first host device; and securely onboarding the component from at least one orchestrator into the at least one first host device based on the assigned onboarding identity and the provided trusted root certificate.

By using an orchestrator which verifies the integrity, authenticity and/or execution environment of a first host device, alternatively of a first host device and a second host device, and potentially further host devices, provides host devices with a trusted root certificate, and which provides an onboarding identity to components that are installed on host devices, a reliable and robust solution for securely onboarding software components, including containerized applications, from the orchestrator to a host device, including transferring the onboarded application to a second host device at later stages, can be provided.

Figure 2:
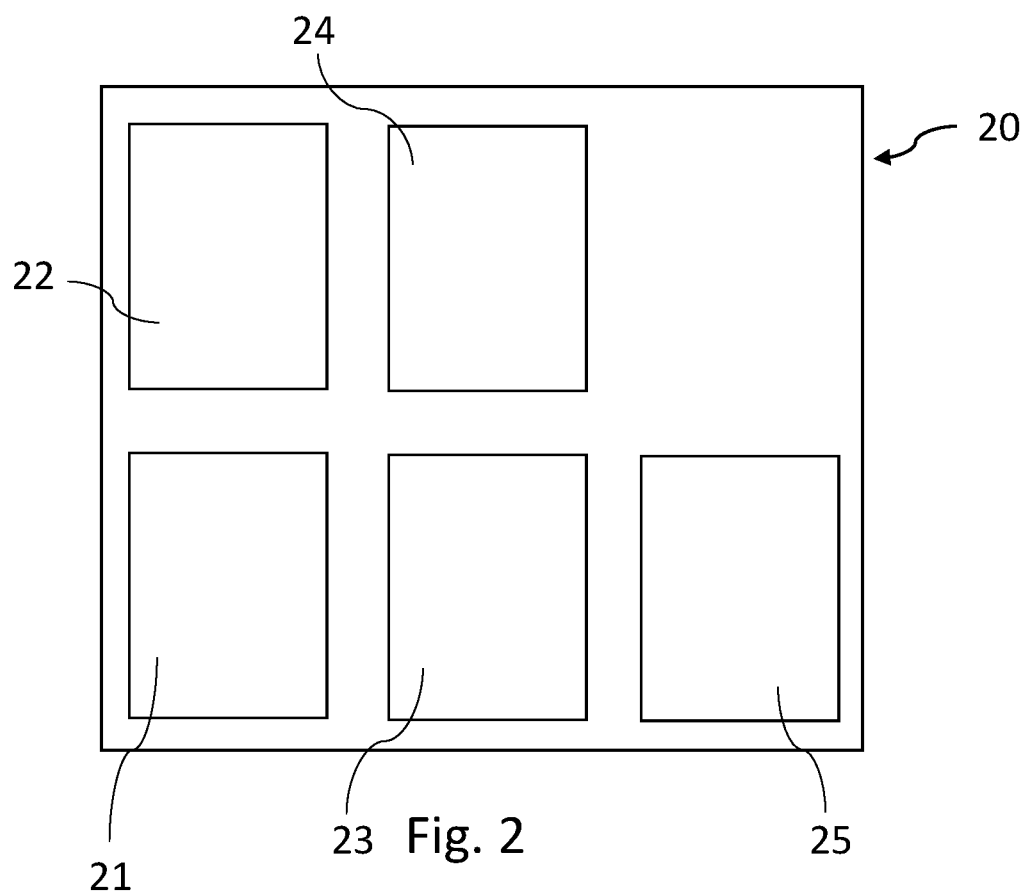
FIG. 2 is a block diagram of an embodiment for a first host device in accordance with the disclosure.

FIG. 2 illustrates an example embodiment of a first host device 20. The first host device 20 comprises a component being a containerized application. Further, the first host device 20 comprises a first receiving unit 21 for receiving a trusted root certificate from at least one orchestrator 40, a second receiving unit 22 for receiving the onboarding identity from the orchestrator 40, an assigning unit 23 for assigning the onboarding identity to the component, and a providing unit 24 for providing the assigned onboarding identity to the second host device 30. Optionally, the assigning unit 23 is a Software Identity Provider, SI. Optionally, the first host device 20 further comprises a hardware protected storage 25, in which the unique key is generated, solely when the onboarding identity from the orchestrator 40 is received.

Figure 3:
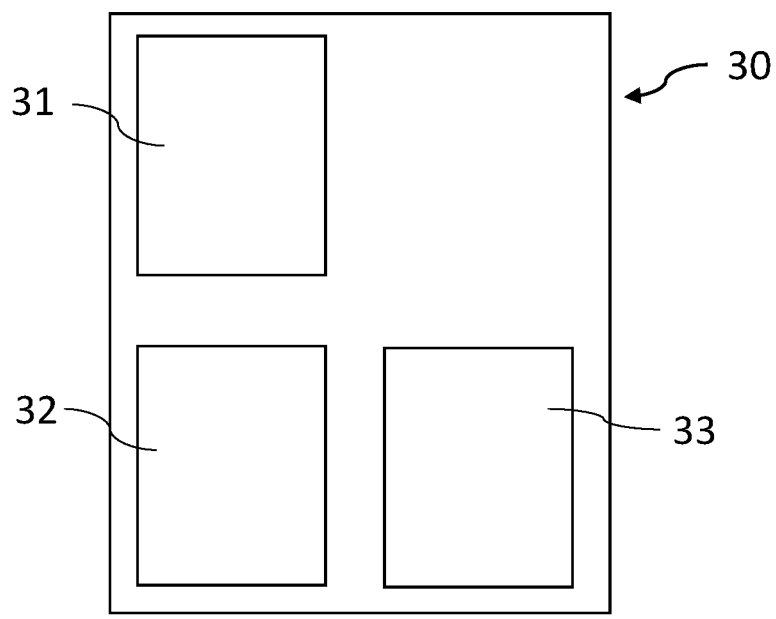
FIG. 3 is a block diagram of an embodiment for a second host device in accordance with the disclosure.

FIG. 3 illustrates an example embodiment of a second host device 30. The second host device 30 comprises a first receiving unit 31, a second receiving unit 32, and a secure onboarding unit 33. The first receiving unit 31 is configured for receiving a trusted root certificate from at least one orchestrator. The second receiving unit 32 is configured for receiving the assigned onboarding identity from at least one first host device. The secure onboarding unit 33 is configured for secure onboarding the component from at least one first host device into the second host device based on the assigned onboarding identity and the provided trusted root certificate. The second host device 30 is communicatively connected to the orchestrator 40 and the first host device 20.

Figure 4:
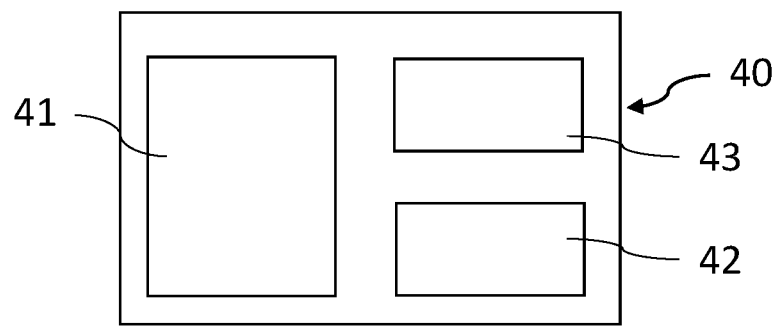
FIG. 4 is a block diagram of an orchestrator in accordance with the disclosure.

FIG. 4 illustrates an example embodiment of an orchestrator 40. The orchestrator 40 comprises a verification unit 41 for verifying the integrity, authenticity and/or execution environment of at least one first host device 20 including the component, and a first providing unit 42 for providing a trusted root certificate to the second host device, and a second providing unit 43 for providing an onboarding identity to at least one first host device. The orchestrator 40 is communicatively connected to the second host device 30 and the first host device 20.

Figure 5:
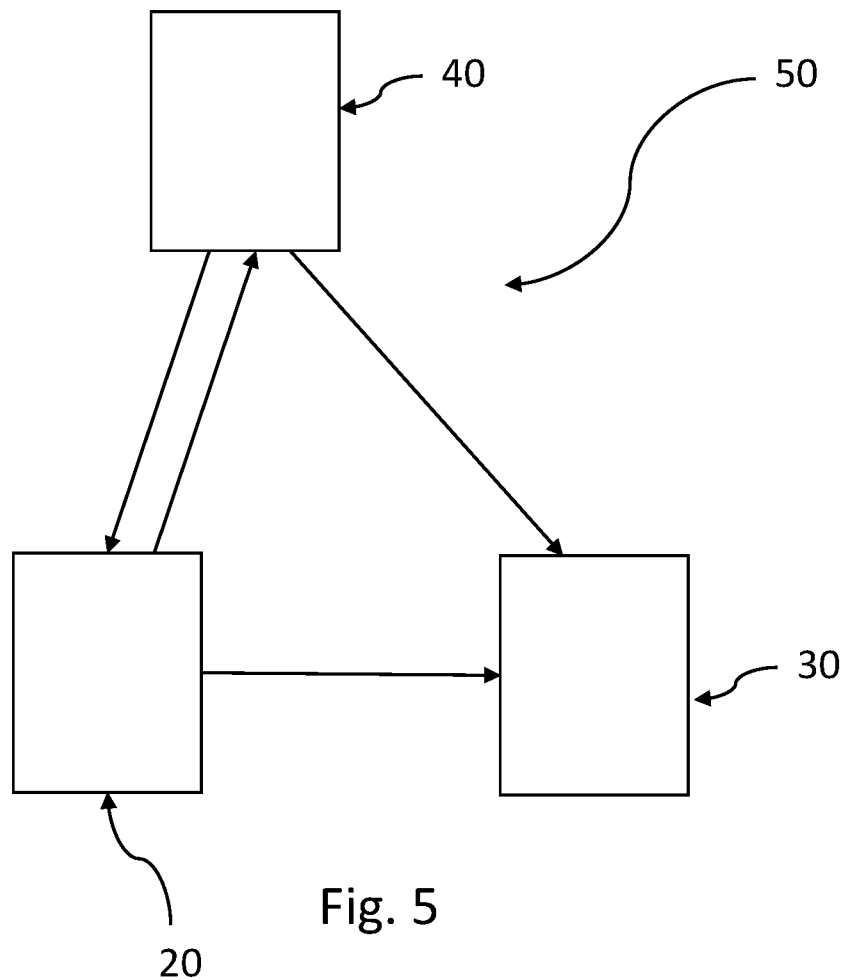
FIG. 5 is a functional diagram of a system for secure onboarding of a component from at least one first host device into a second host device in accordance with the disclosure.

FIG. 5 illustrates an example embodiment of a system 50 for a secure onboarding of a component from at least one first host device 20 into a second host device 30. The secure onboarding is provided by an orchestrator 40, which is communicatively coupled, as depicted by the arrows, to both the first host device 20 and the second host device 30.

The present disclosure has been described in conjunction with a preferred embodiment as examples as well. However, other variations can be understood and effected by those persons skilled in the art and practicing the claimed invention, from the studies of the drawings, this disclosure and the claims. Notably, in particular, the any steps presented can be performed in any order, i.e. the present invention is not limited to a specific order of these steps. Moreover, it is also not required that the different steps are performed at a certain place or at one node of a distributed system, i.e. each of the steps may be performed at a different nodes using different equipment/data processing units.

In the claims as well as in the description the word "comprising" does not exclude other elements or steps and the indefinite article "a" or "a" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

In a general aspect, the verifying of the integrity, the authenticity and/or the execution environment can be provided respectively executed for both the at least one first host device and the at least one second host device by the at least one orchestrator.

The component as used herein may represent any field device, software components, software application and/or containerized application, but is not limited thereto.

The term host device as used herein is to be understood broadly and represents any device including at least one component, e.g., a container, but is not limited thereto. At least one first host device may be a host device which includes the component, wherein the component should be transferred from this host device to a second host device and should be included into the second host device. The second host device may be a host device receiving and integrating at least one component in a safely respectively securely manner. The host device may be a computer system that is interconnected with many other host devices forming a distributed cluster, but is not limited thereto.

The term onboarding as used herein is to be understood broadly and represents any process for configuring components from an out-of-the-box state to an operational state. The onboarding is also mentioned as provisioning or bootstrapping in the art. During onboarding, the component, in particular containerized application, is typically provided with protocol- and environment-specific credentials and settings, which enables the component to operate as expected after onboarding. The secure onboarding defines an onboarding which is the process of securely integrating a component, e.g., a field device or software application, into the target network. The end result of secure onboarding is a functional state of the device that complies with the security objectives of the target network. Secure onboarding is often also referred to as secure bootstrapping or secure provisioning.

The term trusted root-certificate as used herein is to be understood broadly and represents any certificate being provided by the orchestrator indicating and verifying the assigned onboarding identity as to be authentic and trustworthy. In other words, the trusted root certificate enables any host device in the network or system to verify the trustworthiness of components' onboarding identities assigned by the orchestrator. Trusted root certificates may be implemented as X.509 certificates, but are not limited thereto.

The onboarding identity as used herein may represent any identity consisting of a unique key and a digital certificate being associated to an orchestrator, e.g., as proposed by IEEE 802.1AR. In other words, the onboarding identity fulfils the IEEE 802.1AR standard. To protect the (unique) private key from unauthorized access, e.g., by other containerized applications running on the same host device, a Software Identity Provider, SIP, commands the generation of a new key in hardware-protected storage (e.g., in a TPM) and only allows the designated application to access it. This prevents other applications, which may be compromised by an adversary after deployment, from accessing the keys of the containerized application.

The term orchestrator as used herein is to be understood broadly and represents any device in modern software architectures, which deploys and manages software containers running on a distributed cluster of host devices. The orchestrator deploying and managing all components, in particular containerized applications on host devices in a network. The orchestrator may use Kubernetes, but is not limited thereto.

The term verifying of the integrity is to be understood broadly and represents any technique to analyze whether at least one first host device has not been compromised by an adversary. For instance, the verification may be provided by a remote attestation technique. The remote attestation technique is capable of verifying the integrity of software and/or hardware of the first host device. This way it is ensured that the first host device has not been compromised at the time of integrity verification. Remote attestation techniques typically rely on some form of trusted hardware chip on the host device, e.g., a TPM. At boot and runtime, the integrity of the software on the host device is measured and measurements are stored securely in the hardware chip. During attestation, the verifier, in this case orchestrator, queries the device about its software state, whereupon the device answers with the software integrity measurements signed with a key that is stored protected in the hardware chip. The verifier checks whether (i) the received measurements match expected reference measurements, and (ii) the signature of the signed measurements are correct. There are several standards on remote attestation, e.g., defined by the Trusted Computing Group (TCG) or IETF RATS working group.

The term verifying of the authenticity is to be understood broadly and represents any technique to analyze if at least one first host device has been installed by a system integrator or is maintained by a cloud provider. In other words, this verification verifies if the first host device is legitimate, unmodified, and up-to-date. For instance, the verification may be provided by an X.509 certificate signed by the system integrator or cloud provider that can be verified by their CA certificate, but is not limited thereto.

The term verifying of the execution environment is to be understood broadly and represents any technique to analyze if at least one first host device runs the in trustworthy environments, i.e. environments that are not controlled by an adversary. For instance, the verification may be provided by a remote attestation technique. Therefore, it can be ensured that no malicious code runs on the first device. The remote attestation technique may be identical or different to the remote attestation technique verifying the integrity of at least one first host device.

By using an orchestrator which verifies the integrity, authenticity and/or execution environment of a first host device, alternatively of a first and a second host device, and potentially further host devices, provides host devices with a trusted root certificate, and which provides an onboarding identity to components that are installed on host devices, a reliable and robust solution for securely onboarding software components, including containerized applications, from at least one first host device to at least one second host device.

In an embodiment of the method for transferring a secure onboarding of a component from at least one first host device into a second host device, the verifying of the integrity of the at least one first host device is provided by a remote attestation technique.

Alternatively, the verifying of the integrity of the at least one first host device and the at least one second host device is provided by a remote attestation technique.

The term remote attestation technique is to be understood broadly and represents any technique which verifies that a component, in particular a containerized application, run on legitimate devices in an uncompromised software environment. For instance, a remote attestation technique may common remote attestation techniques which are known in the computer security. Exemplary remote attestation techniques are "TCG Trusted Attestation Protocol (TAP)" defined by the Trusted Computing Group and "TPM-based Network Device Remote Integrity Verification" defined by the IETF RATS working group, but is not limited thereto. Advantage of using remote attestation techniques is that they can verify the integrity of the software remotely. Without remote attestation, a component may be onboarded on a compromised device, i.e., a device that runs software controlled by the adversary. In this case, no security guarantees could be provided by the onboarded component and the entire system would be in an insecure state.

In an embodiment of the method for providing a secure onboarding of a component from at least one first host device into a second host device, the verifying of the authenticity of the at least one first host device is provided by a security certificate.

The term security certificate is to be understood broadly and represents any cryptographic certificate. For instance, the security certificate may be an IEEE 802.1AR IDevID certificate, but is not limited thereto.

In an embodiment of the method for transferring a secure onboarding of a component from at least one first host device into a second host device, the verifying of the execution environment of the at least one first host device is provided by a remote attestation technique.

Alternatively, the verifying of the execution environment of the at least one first host device and at least one second host device is provided by a remote attestation technique.

The term remote attestation technique for verifying the execution environment is to be understood broadly and represents any technique which verifies that no malicious code is running on the first host device. Exemplary, such remote attestation techniques are "Attestation Services for Intel® Software Guard Extensions" by Intel, "AMD SEV-SNP Attestation" by AMD, but is not limited thereto. Remote attestation for trusted execution environments rely on the same principles as remote attestation techniques for the entire host. However, they differ in their implementation and internal workings from "host" remote attestation techniques. Thus, the attestation method for TEEs is very likely different than attestation method for entire host (e.g., based on TPM).

In an embodiment of the method for providing a secure onboarding of a component from the orchestrator into a first host device, the assigned onboarding identity comprises a unique key and a digital certificate being associated with the orchestrator.

The term unique key is to be understood broadly and represents any cryptographic key which is unique to the component. The unique key may typically be generated on the host device itself, stored in secure hardware (e.g., TPM or TEE), and never leaves the secure hardware. The public part of the key is then certified by the orchestrator in the onboarding identity certificate. However, it is not limited thereto.

The term digital certificate being associated to the orchestrator is to be understood broadly and represents any certificate which is signed by a Certificate Authority, CA, which is either part of the orchestrator or can be instructed by the orchestrator to issue certificates.

In an embodiment of the method for providing a secure onboarding of a component from at least one first host device into a second host device, the unique key is generated from at least one first host device, solely when the onboarding identity from the orchestrator is received.

This feature has the advantage that keys are generated by the host device in secure hardware to prevent them from being exfiltrated by the adversary. A key should never leave the secure hardware. This is common practice.

In an embodiment of the method for providing a secure onboarding of a component from at least one first host device into a second host device, the digital certificate associated to the orchestrator is a DevID, IDevID or a LDevID certificate fulfilling a IEEE 802.1AR standard.

In an embodiment of the method for providing a secure onboarding of a component from at least one first host device into a second host device, the trusted root certificate is a certificate provided by an orchestrator's certificate authority.

The term orchestrator's certificate authority is to be understood broadly and represents any authority which provides certificates. For instance, an authority for providing trusted root certificates may be a certificate authority as in typical Public Key Infrastructures (PKIs), but is not limited thereto.

In an embodiment of the method for providing a secure onboarding of a component from at least one first host device into a second host device, the trusted root certificate is a certificate provided by a root certificate authority.

The term root certificate authority is to be understood broadly and represents any authority which provides common, known or well-known root certificates. A known or well-known root certificate is a certificate that is regarded as trustworthy by well-established organizations or coalitions of (industrial) communities, e.g. NAMUR, OPAF, FieldComm Group. For instance, trusted certificates that are preinstalled in operating systems, e.g. "Trusted Root Certification Authorities" in Windows Certificate Store, or web browsers, e.g. root certificate trusted by Google Chrome, but are not limited thereto.

In an embodiment of the method for providing a secure onboarding identity for at least one first host device by the orchestrator is relying on mechanisms specified by FIDO Device Onboarding (FDP), Open Platform Communications 10000-21 (OPC 10000-21), Secure Zero Touch Provisioning (SZTP), or IETF Bootstrapping Remote Secure Key infrastructure (BRSKI).

These protocols rely on mechanisms specified by FIDO Device Onboarding (FDP), Open Platform Communications 10000-21 (OPC 10000-21), Secure Zero Touch Provisioning (SZTP), or IETF Bootstrapping Remote Secure Key infrastructure (BRSKI).

In an embodiment of the method for providing a secure onboarding of a component from at least one first host device into a second host device, the method further comprises the steps of identifying a shortage of resources in a first host device by the at least one orchestrator; identifying a second host device by the at least one orchestrator; providing a trusted root certificate to the second host device by the at least one orchestrator; executing a migration protocol between the orchestrator, the first host device and the second host device, wherein the migration protocol comprises the following steps: deleting the unique key and the trusted certificate associated with the orchestrator on the first host device, generating a new assigned onboarding identity on the second host device; secure onboarding the component from the first host device into the second host device based on the assigned onboarding identity and the provided trusted root certificate. Therefore, a shift of the component from a first host device to a second host device can be provided.

The term identification of a shortage as used herein is to be understood broadly and represents that the orchestrator identifies a shortage of resources in a first host device. The identification of the shortages may be provided by asking the host device for its resource consumption or identifying large delays. The shortage of resources may be limited computing resources, memory resources, network resources, but is not limited thereto.

The term identification of a second host device is to be understood broadly and represents that the orchestrator identifies a further, or different host device. The identification of the second host system may be provided by the same identification mechanisms applied for the first host device.

The term migration protocol is to be understood broadly and represents any protocol which provides a migration. For migration, the orchestrator uses the same technique used for the first host device to verify & onboard the second host device and afterwards the onboarding identity is deleted on the first host device.

In a further aspect, a first host device is presented. The first host device comprises a component; a first receiving unit for receiving a trusted root certificate from at least one orchestrator; a second receiving unit for receiving the onboarding identity from the at least one orchestrator; an assigning unit for assigning the onboarding identity to the component; and a providing unit for providing the assigned onboarding identity to the second host device by the at least one first host device.

In an embodiment of the first host device, the assigning unit is a Software Identity Provider, SIP.

The term SIP as used herein is to be understood broadly and represents any identity provider which offers an abstraction layer to the underlying secure hardware, which ensures that each containerized application can only access its own onboarding key but not the keys of other applications, and which allows credentials to be securely moved from one host device to another that is required when the orchestrator shifts containerized applications from one host device to another host device. The SIP receives onboarding credentials from the orchestrator and assigns them to a specific component.

In an embodiment of the first host device, the host device further comprises: a hardware protected storage, in which the unique key is generated.

Afterwards, the onboarding identity from the orchestrator for the specific public part of the key is requested and received by the SIP.

The term hardware protected storage is to be understood broadly and represents any data storage device being protected against internal and external requests. For instance, the hardware protected storage may be a memory or cache, but is not limited thereto, on which keys, in particular the unique keys, are stored and generated, wherein these keys cannot be transferred. Further, exemplary, the hardware protected storage may be a Trusted Platform Module, TPM, but is not limited thereto.

In a further aspect, a second host device is presented. The second host device comprises a first receiving unit for receiving a trusted root certificate from the at least one orchestrator; a second receiving unit for receiving the assigned onboarding identity from the at least one first host device; and a secure onboarding unit for secure onboarding the component from at least one first host device into the second host device based on the assigned onboarding identity and the provided trusted root certificate.

In a further aspect, an orchestrator is presented. The orchestrator comprises a verification unit for verifying the integrity, authenticity and/or execution environment of the at least one first host device including the component; a first providing unit for providing a trusted root certificate to the second host device, and a second providing unit for providing an onboarding identity to the at least one first host device.

In a further aspect, a system for a secure onboarding of a component from at least one first host device into a second host device is presented. The system comprises a first host device as disclosed above; a second host device as disclosed above; and an orchestrator as disclosed above.

By providing a system including an orchestrator which verifies the integrity, authenticity and/or execution environment of a first host device, which provides a trusted root certificate to the second host device, and which provides an onboarding identity to at least one first host device, a reliable and robust solution for securely onboarding software components, including containerized applications, from a first host device into a second host device, i.e. in an industrial system, can be provided.

Any disclosure and embodiments described herein relate to the method, the first host device, the second host device, the orchestrator and the system, lined out above and vice versa. Advantageously, the benefits provided by any of the embodiments and examples equally apply to all other embodiments and examples and vice versa.

As used herein "determining" also includes "initiating or causing to determine", "generating" also includes "initiating or causing to generate" and "providing" also includes "initiating or causing to determine, generate, select, send or receive". "Initiating or causing to perform an action" includes any processing signal that triggers a computing device to perform the respective action.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for providing a secure onboarding of a component from at least one first host device into a second host device, comprising:

verifying an integrity, authenticity and/or execution environment of the at least one first host device including the component by at least one orchestrator;

providing a trusted root certificate to the second host device by the at least one orchestrator;

providing an onboarding identity by the at least one orchestrator to the at least one first host device, when the integrity, the authenticity and/or the execution environment of the at least one first host device has been verified;

receiving the onboarding identity from the orchestrator by the at least one first host device and assigning the onboarding identity to the component by the at least one orchestrator;

passing the assigned onboarding identity to the second host device by the at least one first host device; and securely onboarding the component from the at least one first host device into the second host device by the orchestrator device based on the assigned onboarding identity and the provided trusted root certificate.

2. The method according to claim 1, wherein the verifying of the integrity of the at least one first host device is provided by a remote attestation technique.

3. The method according to claim 1, wherein the verifying of the authenticity of the at least one first host device is provided by a security certificate.

4. The method according to claim 1, wherein the verifying of the execution environment of the at least one first host device is provided by a remote attestation technique.

5. The method according to claim 1, wherein the assigned onboarding identity comprises an unique key and a digital certificate being associated with the orchestrator.

6. The method according to claim 5, wherein the unique key is generated from the at least one first host device, solely when the onboarding identity from the orchestrator is received.

7. The method according to claim 5, wherein the digital certificate associated to the orchestrator is a DevID, IDevID or a LDevID certificate fulfilling a IEEE 802.1AR standard.

8. The method according to claim 1, wherein the trusted root certificate is a certificate provided by an orchestrator's certificate authority.

9. The method according to claim 1, wherein the trusted root certificate is a certificate provided by a root certificate authority.

10. The method according to claim 1, wherein the onboarding is provided by Feature Data Object, FDO, protocol, by Bootstrapping Remote Secure Key infrastructure, BRSKI, protocol, by Open Platform Communications, OPC 10000-21, protocol or by Secure Zero Touch Provisioning, SZTP, protocol.

11. The method according to claim 1, further comprising:
identifying a shortage of resources in a first host device by the at least one orchestrator;
identifying a second host device by the at least one orchestrator;
providing a trusted root certificate to the second host device by the at least one orchestrator;
executing a migration protocol between the orchestrator, the first host device and the second host device;
wherein the migration protocol comprises:
deleting the unique key and the trusted certificate associated with the orchestrator on the first host device, and
generating a new assigned onboarding identity on the second host device; and
securely onboarding the component from the first host device into the second host device based on the assigned onboarding identity and the provided trusted root certificate.

* * * * *